Jan. 20, 1959  J. GIESEN  2,870,133
PRODUCTION OF PHENOLS BY CATALYTIC HYDROGENATION OF LIGNIN
Filed Oct. 19, 1954
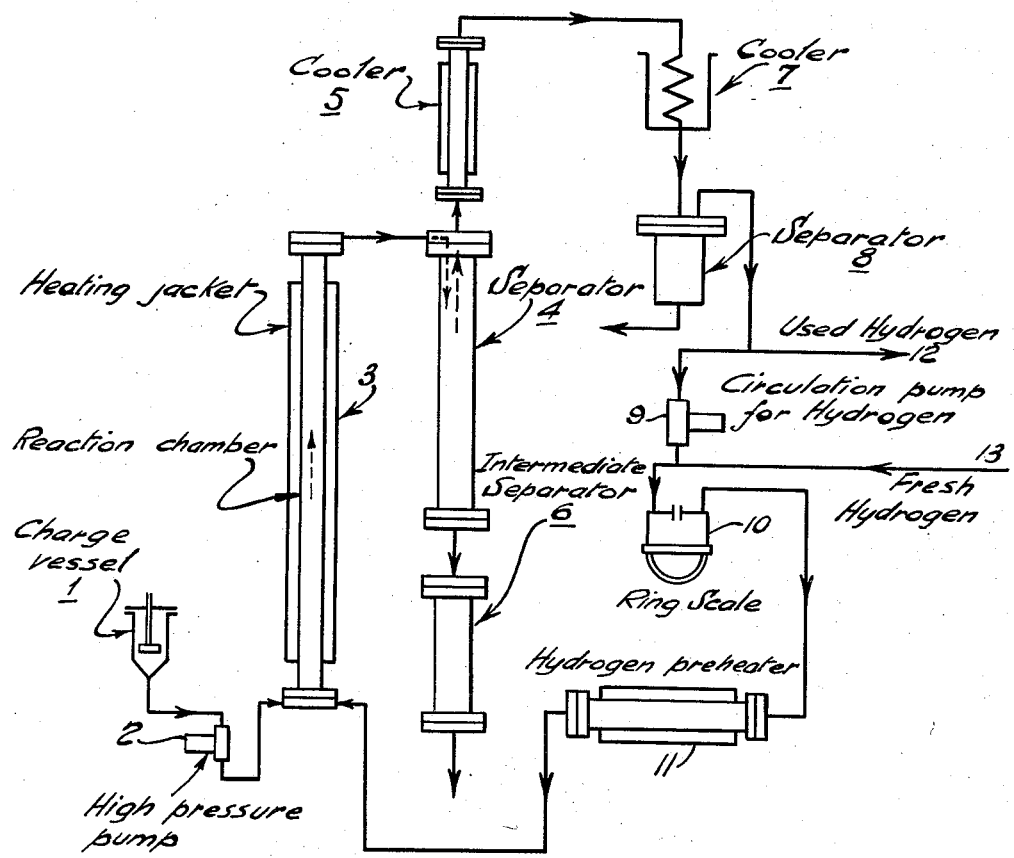
INVENTOR
Johann Giesen
BY
ATTORNEYS United States Patent Office 2,870,133
Patented Jan. 20, 1959

2,870,133

PRODUCTION OF PHENOLS BY CATALYTIC HYDROGENATION OF LIGNIN

Johann Giesen, Haldenstein, near Chur, Switzerland, assignor to Inventa A.-G., für Forschung und Patentverwertung Luzern, Lucerne, Switzerland Application October 19, 1954, Serial No. 463,291

Claims priority, application Switzerland November 21, 1953

4 Claims. (Cl. 260—124)

The present invention relates to the process of splitting lignin to obtain useful products therefrom.

One object of the invention is to split lignin by a new and improved process which will produce a comparatively high yield of distillable products.

A further object of the invention is to split lignin by a new and improved process which will produce a comparatively high yield of distillable products and which can be successfully carried out with lignins of different types, and especially with the so-called "Scholler lignin."

In the process of copending application Serial No. 460,936, filed October 7, 1954, it was disclosed that the continuous cleavage of lignin by treatment with hydrogen at high temperatures and pressures without catalysts leads even with a short period of reaction to distillable products in good yield. In this procedure, the lignin made into a paste in a rubbing agent (dispersion vehicle), preferably xylenol, is pressed steadily together with the hydrogen through the reaction chamber and the reaction products forming immediately after they leave the reaction chamber are cooled off together with the rubbing agent and are collected in a separator and separated from the hydrogen. According to this process, a decomposition of 70-80 percent of the lignin put in is obtained, according to the period required for the lignin to pass through the reaction chamber. The distillable products obtained by this process contain a substantial amount of phenolic products.

It has now been found in accordance with the present invention, that the conversion of the lignin can be increased considerably more, if to the mixture of lignin to be converted, certain catalysts are added with the rubbing agent, namely an iron salt having a sulfur containing anion and preferably sulphates, sulphites or sulphides of iron. In so doing, it has surprisingly been found that one gets along with relatively slight quantities of catalyst. Use is made with particular advantage of ferrosulphate as catalyst, the serviceability of which for the decomposition of lignin has not as yet been described heretofore. In a way not to be foreseen, it has developed that ferrosulphate, even though in slight quantities, is extremely effective and considerably increases the yield in distillable products. Even with an addition of 2.5 percent of ferrosulphate as catalyst (in relation to lignin), the conversion of the lignin amounts practically to 100 percent and one obtains a yield of about 60 percent in total distillable products as against a yield of only 47 percent under the same conditions of reaction but without catalyst.

No detailed investigation has been made into the question into what catalytically effective form, the ferrosulphate is converted under the chosen conditions of reaction. It has merely been ascertained that in the recovered catalyst separated from the reaction products, the iron is present partly in oxidic form and partly in sulphidic form. This ascertainment is in agreement with investigations of Ipatiew (Reports, 59, 1412, 1926), according to which from an aqueous ferrosulphate solution under the action of hydrogen at 330° and 200 atmospheres, a precipitate becomes separated consisting of ferrosulphite and microcrystalline magnetic iron oxide and at 350° and 260 atmospheres only crystalline ferrosulphide becomes separated. Thus, it is to be assumed that a specific catalytic action is ascribable to the mixture of iron oxide and iron sulphide that is so formed.

The continuous decomposition described can be carried out with lignins of every sort, and more particularly with the lignin derived from the technical process of saccharification of wood, for example with the so-called "Scholler lignin" that is obtained when wood is saccharified with dilute sulphuric acid according to Scholler, and also with the lignin obtainable from the lye-washing of sulphate cellulose manufacture. For the decomposition of Scholler lignin, it is advisable to neutralize the sulphuric acid contained in it by addition of caustic lime.

In carrying out the process of the present invention, the lignin is made into a paste by means of a mill through a suitable rubbing agent. The rubbing agent is desirably a high boiling liquid of phenolic or non-phenolic nature that is able to dissolve the cleavage products forming from the lignin. Xylenol is particularly useful for the purpose. Also advantageous for use as a rubbing agent are the distillable products obtained in a preceding decomposition phase and having such high boiling point.

The lignin paste containing the catalyst described is fed continuously to the inlet of a reaction chamber at the same time as hydrogen and the reaction mixture is continuously forced through the reaction chamber, while said mixture is maintained at a temperature above 250° C. and a pressure above 300 atmospheres.

The process according to the invention is illustrated in the light of the following examples and of the drawing showing diagrammatically an apparatus for carrying out the process, but the broader aspects of the invention are not confined to them.

*Example 1*

A mixture having the following composition:

12.30 kg. of Scholler lignin (water content 5.5%)
 0.60 kg. of caustic lime
 0.31 kg. of ferrosulphate
46.20 kg. of xylenol
—————
59.41 kg.

is ground into a thin pulp in a ball mill, delivered to a charge vessel 1 and forced continuously by means of a high pressure pump 2 into the lower end of a vertically arranged reaction tube or chamber 3. The rate of feed from the pump 2 to the inlet end of the reaction chamber 3 is controlled, to effect the necessary decomposition of lignin therein, without subjecting the products formed to subsequent reaction which will reduce the yield. At the same time with the feed of the paste, hydrogen circulated by a pump 9 and preheated in a preheater 11 to 300°–350° C. is delivered continuously to the bottom of the reaction chamber 3, to form with the paste delivered from the high pressure pump 2 a liquid and gas mixture under a pressure of 700 atmospheres. This liquid and gas mixture flows continuously upward in the reaction chamber 3, while the temperature in this reaction chamber is maintained at about 380° by an electric heating jacket. The reaction mixture and the free hydrogen not absorbed in the formation of the decomposition products emerge together at the upper end of the reaction chamber 3 and reach the upper end of a separator 4. The liquid portions of the mixture fall in the separator 4, while the gas is drawn off through a cooler 5 in which the readily volatile portions are condensed and caused to fall back into the separator 4. This cooling action takes place immediately after the reaction mixture leaves the reaction chamber 3. The liquid separated in the separator 4 is discharged into an intermediate receptacle 6 and the liquid products together with the catalyst and with the calcium sulfate formed by the reaction of the sulfuric acid in the Scholler lignin with the caustic lime added to the initial charge mixture are drawn from the intermediate receptacle 6.

Any residual readily boiling portions not condensed in a cooler 5 are carried over to a super-cooler 7, condensed therein and discharged into a separator 8. A part of the hydrogen leaving the separator 8 is released at 12, and is replaced at 13 by fresh hydrogen, which together with the unused hydrogen, is turned back for recirculation through the system. The circulating quantity of hydrogen gas is continuously measured by a ring scale device 10.

The 59.41 kg. of mixture brought in is worked upon in the manner described in 35 hours. At a feed efficiency of the high pressure pump 2 of 1.7 liters per hour and a capacity of the reaction chamber 3 of 2.1 liters, the time the reaction mixture remains in the reaction chamber amounts to approximately 1¼ hours.

The crude oil obtained by the process described from the receptacle 6 and the separator 8 constitutes a solution of the cleavage products of the lignin in the added xylenol and contains in addition the catalyst and the formed calcium sulphate as finely divided solid constituents. These are separated from the oil in known manner by filtration or centrifugation. The oil is decomposed by distillation and in this procedure the following distillates are obtained with perfect recovery of the xylenol:

(1) Oil passing over through distillation at normal pressure between 60° and 180° C., of specific gravity 0.850: 0.35 kg.=3.0 percent of lignin.

(2) Oil passing over through distillation at 6 mm. Hg between 150° and 325° C., containing phenols: 6.40 kg.=55.0 percent of lignin.

Thus, all together 58 percent of the lignin is obtained in distillable products. As solid distillation residue, there remains behind 1.40 kg.=12.0 percent of lignin.

*Example 2*

A mixture containing about twice the quantity of catalyst in comparison with Example 1 of:

8.30 kg. of Scholler lignin (water content 5.0%)
0.42 kg. of caustic lime
0.45 kg. of ferrosulphate
31.35 kg. of xylenol 40.52 kg. together is converted continuously at 380° C. and 700 atmospheres of hydrogen pressure in approximately 21 hours in the arrangement described in Example 1. With the quantity of 1.9 kg. brought in per hour, the time the reaction mixture remains in the reaction chamber 3 comes to 1.1 hour.

The crude oil obtained is processed as in Example 1; in addition to the recovered xylenol there are obtained:

(1) Oil passing over by distillation at normal pressure between 55° and 180° C., of specific gravity 0.85: 0.28 kg.=3.5 percent of lignin.

(2) Oil passing over by distillation at 6 mm. of Hg between 150° and 320° C., containing phenols: 4.30 kg.=54.6 percent of lignin.

In relation to the lignin used (figured water-free) 58.1 percent of distillable products are accordingly obtained. In addition, 1.07 kg.=13.6 percent of lignin is obtained as non-distillable residue.

While the invention has been described with particular reference to specific examples, it is to be understood that it is not to be limited thereto but is to be construed broadly and restricted solely by the scope of the appended claims.

What is claimed is:

1. The process of decomposing lignin into distillable products containing a substantial amount of phenols, which comprises the steps of mixing the lignin with an xylenol as a liquid dispersing agent and ferrosulfate as a hydrogenation catalyst to form a thin paste, continuously feeding this paste under high pressure to the inlet end of a reaction chamber maintained at a temperature of above 250° C. and a pressure of above 300 atmospheres, while continuously delivering to the inlet end of the reaction chamber hydrogen under high pressure, whereby the mixture of paste and hydrogen passes continuously through said reaction chamber and said paste and said hydrogen are reacted to decompose the lignin into distillable products, separating the liquid portions from the gases immediately after the reacted mixture is discharged from the outlet of the reaction chamber, and distilling the liquid portions to obtain the distillable lignin decomposition products therefrom.

2. The process of decomposing lignin into distillable products as described in claim 1, wherein the reaction chamber is maintained at a pressure of about 700 atmospheres.

3. The process of decomposing lignin into distillable products as described in claim 1, wherein the reaction chamber is maintained at a temperature of between 360° and 400° C.

4. The process of decomposing lignin into distillable products as described in claim 1, wherein the reaction is carried out in said reaction chamber in the absence of any water added to the reaction mixtures aside from that contained in the lignin before mixing with the catalyst.

References Cited in the file of this patent

UNITED STATES PATENTS 2,331,154    Adkins _____ Oct. 5, 1943

FOREIGN PATENTS 71,006    Sweden _____ Oct. 5, 1928

OTHER REFERENCES

Chemical Abstracts, 45, 4445 (1951).